United States Patent

Kurachi et al.

[11] Patent Number: 5,173,739
[45] Date of Patent: Dec. 22, 1992

[54] AUTOMATIC LENSMETER FOR PROGRESSIVE ADDITION LENS

[75] Inventors: Mikio Kurachi, Aichi; Toshiaki Mizuno, Gamagori; Hirokatsu Obayashi, Aichi, all of Japan

[73] Assignee: Nidek Co., Ltd., Japan

[21] Appl. No.: 725,715

[22] Filed: Jul. 3, 1991

[30] Foreign Application Priority Data

Jul. 6, 1990 [JP] Japan .................................. 2-179877

[51] Int. Cl.⁵ .............................................. G01B 9/00
[52] U.S. Cl. .................................... 356/124; 356/127
[58] Field of Search ................. 356/124, 125, 126, 127

[56] References Cited

U.S. PATENT DOCUMENTS 4,730,924 3/1988 Allard et al. .................... 356/124

FOREIGN PATENT DOCUMENTS 0193897 9/1986 European Pat. Off. .
3629676 3/1988 Fed. Rep. of Germany .
61-251732 11/1986 Japan .

Primary Examiner—F. L. Evans
Attorney, Agent, or Firm—Nikaido, Marmelstein, Murray & Oram

[57] ABSTRACT

An automatic lensmeter according to the present invention is used for accurately measuring optical characteristics of a lens to be examined. The automatic lensmeter incorporates a mode change-over switch for switching to an addition diopter measurement mode, memory means for storing cylindrical diopter of a measured far-vision area of the lens, calculation means for calculating a difference between the cylindrical diopter measured in the addition diopter measurement mode and the cylindrical diopter of the far vision portion, and display means for indicating a calculated result of the calculation means thereon.

5 Claims, 4 Drawing Sheets

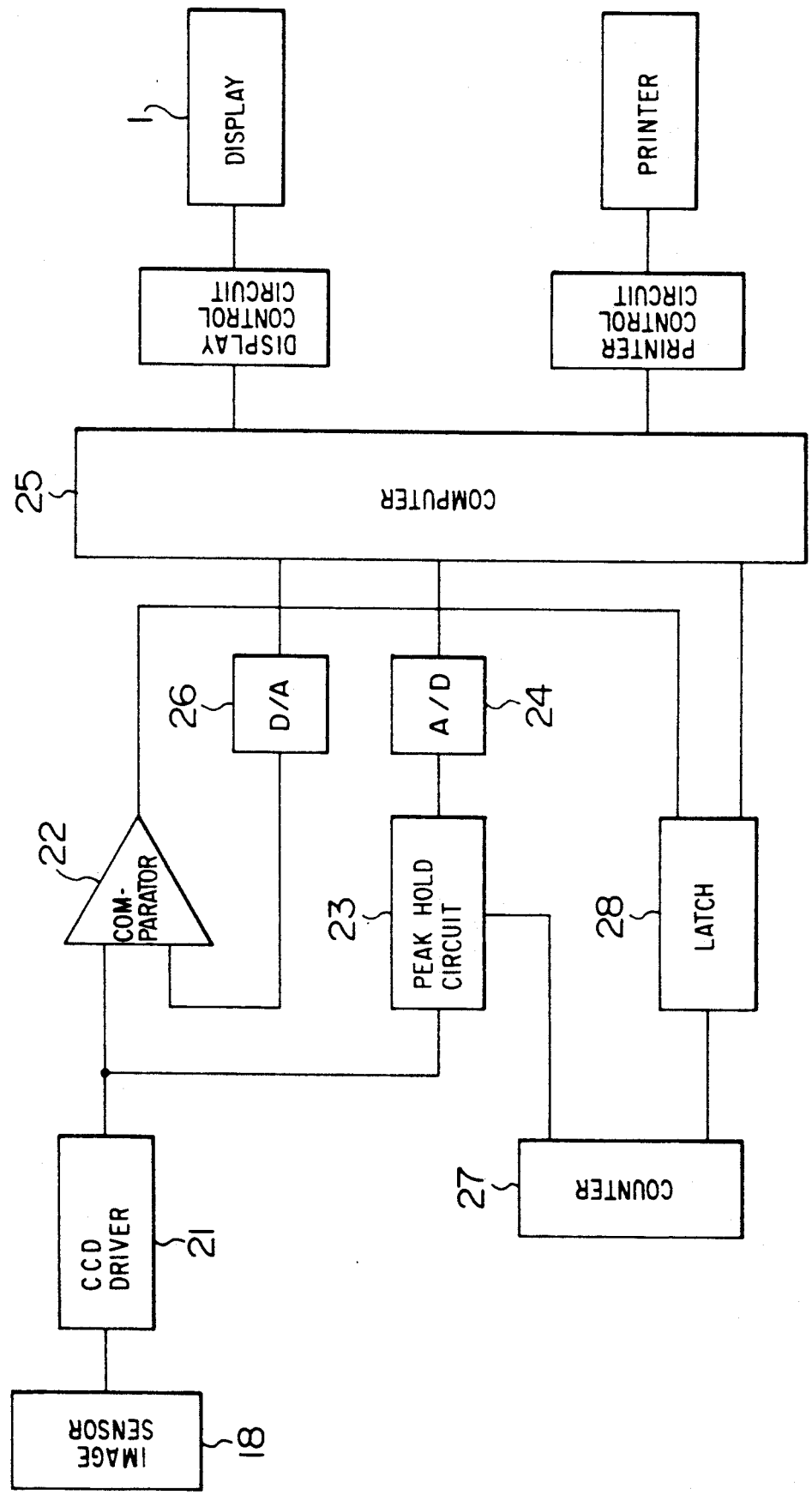

AUTOMATIC LENSMETER FOR PROGRESSIVE ADDITION LENS

BACKGROUND OF THE INVENTION

The present invention generally relates to automatic lensmeters and, more particularly to a lensmeter which has a mechanism suitable for find a measuring position for near vision at the time of measuring addition diopter of a progressive addition lens.

There have been so far proposed various sorts of lensmeter for automatically measuring various optical characteristics of ophthalmic lenses for use in spectacles. These lensmeters have measuring mechanisms which have different unique features and a common feature that a target having a predetermined pattern is provided on the object or image side of a lens to be measured so that a light receiving element detects the target image formed thereon, whereby optical characteristics of the lens are measured on the basis of the detected result.

As the number of elderly people has increased, the use of progressive addition lenses has recently increased in ophthalmic lenses for middle-age people. However, it often occurred that, since it is structurally difficult to find the suitable position for measuring optical powers in the near vision portion from its outside in the progressive addition lens, measurement is erroneously carried out in the wrong measuring position whereby an accurate addition diopter cannot be obtained. This is because, in the progressive addition lens, the measurement of refractive powers of the far vision portion is not especially difficult as a result of its broad area. However, marks (printed marks) indicative of measuring points for the far- and near-vision portions are erased after the lens is once processed, so that it becomes difficult to find the measuring position for the near vision portion.

There has been conventionally suggested a method of finding the near-vision measuring point with the use of a hidden mark indicative of the horizon of the lens and a template indicative of the measuring point. Even in this method, however, it is difficult to find the hidden mark because the lens has usually many scars on its surface. In addition, this method is defective in that, even if the hidden mark is found, it is hard to select a suitable one of such templates since they differ from manufacturer to manufacturer.

For the purpose of eliminating the above defects a positioning mechanism for accurately measuring addition diopter of a progressive addition lens has been proposed in JP-A-61-251732.

The proposed mechanism, considering that far- and near-vision portions in a progressive addition lens are different in spherical refractive power but are equal in cylindrical refractive power. The mechanism incorporates comparison means for outputting a positioning completion signal when $S^0 \neq S^1$ and $C^0 = C^2$ and a display unit driven by the completion signal.

According to this mechanism, an accurate measured value of the lens is obtained under measurement when an indication saying the positioning completion is displayed on the display unit. With the mechanism, however, since an operator can know only the fact that the positioning is completed, he cannot judge to what degree the area being now measured deviates from the near vision portion. Accordingly, this mechanism requires a considerable time before the positioning completion and also a considerably experienced operator.

SUMMARY OF THE INVENTION

It is an object of the present invention to provide an automatic lensmeter with a display function, whereby at the time of measuring the addition diopter of a progressive addition lens, the amount of optical strain measured in the peripheral portion is displayed for the purpose of avoiding the measurement of the peripheral portion causing errors. Thus, only the refractive powers in the progressive portion or near vision portion is measured, so that accurate addition diopter of the lens can be obtained.

In accordance with one aspect of the present invention, there is provided an automatic lensmeter wherein a target having a predetermined pattern provided on an object or image side of a lens to be examined is subjected to projection of a measuring light beam to form a projected target image on the target, the target image is detected at light receiving elements, and optical characteristics of the lens under examination are measured on the basis of detected results, the lensmeter comprising:

a mode change-over switch for switching to an addition diopter measurement mode;

memory means for storing cylindrical diopter of optical characteristics of a measured far-vision area of the lens;

calculation means for calculating a difference between the cylindrical diopter measured in the addition diopter measurement mode and the cylindrical diopter of the far vision portion; and display means for indicating a calculated result of the calculation means thereon.

As a result of studying the causes of measurement errors involved in measuring refractive power in the near vision portion of a progressive addition lens, the inventor of the present invention has found that the errors can be eliminated when the optical characteristics of the progressive addition lens, especially in its peripheral portion are taken into consideration. More specifically, a progressive addition lens comprises a far vision portion, a progressive area near vision portion and peripheral portion as shown in FIG. 4. The peripheral portions inevitably result in optical strain when adjusting refractive powers between the far- and near-vision portions. When the optical characteristics of the peripheral portion are measured, it has been found that, in the case that the far vision portion has no astigmatism, cylindrical refractive power is increased for its more leftward and rightward areas from the progressive and near vision portions, though the distribution slightly varies depending on the type of progressive addition lenses. Accordingly, we can judge that measurement is done for the progressive or near-vision portion when the amount of optical strain is zero; while measurement is done for the peripheral portion when the optical strain is not zero. As a result, when the measuring position is varied so that cylindrical refractive power (optical strain) becomes smaller, the position of the progressive or near-vision portion can be found.

Further, in the case of a progressive addition lens with a far vision portion having astigmatism, the lens not only has optical strain in the absence of astigmatism therein but also has a generally toric surface all over its inner surface. Thus the lens can be considered to have such an optical property applicable with the same astigmatism throughout the entire lens surface. An equiastigmatic diagram finely varies depending on the cylindrical axial angle in the far vision portion, but the absolute value of the difference between the cylindrical diopters of the near- and far-vision portions becomes larger toward the peripheral portion.

From the above consideration, the measured cylindrical diopter of the far vision portion is stored in the memory means regardless of the presence or absence of astigmatism in the far vision portion. The mode is changed to the addition diopter measurement mode by means of the mode change-over switch for continual measurement. The difference between the measured cylindrical diopter and the stored cylindrical diopter of the far vision portion is calculated by the calculation means, and its calculated result is displayed to inform the operator of it. Specifically, the operator can distinguish either the peripheral portion, the near vision portion, or the progressive portion which he is now measuring. In other words, when the displayed value is not zero, the peripheral portion is judged as now being measured. When the displayed value is zero, the near vision portion or progressive portion is judged as currently being measured.

Further, when the displayed value is not zero for the area being now measured, the operator can judge to what degree the peripheral portion being currently measured is spaced from the progressive or near-vision portion on the basis of the displayed value.

Furthermore, the operator can know the direction of which he should move the lens on the basis of the displayed value varied larger or smaller. Since the near vision portion is connected continuously to the progressive portion, the addition diopter of the near vision portion can be obtained by continually measuring the addition diopter along the progressive portion and toward the outer periphery of the lens, and then by finding the maximum of the measured values.

BRIEF DESCRIPTION OF THE DRAWINGS

FIG. 3 is a block diagram of a control system used in the automatic lensmeter of the embodiment.

DESCRIPTION OF THE PREFERRED EMBODIMENTS

An embodiment of the present invention will be detailed with reference to the attached drawings.

Figure 1:
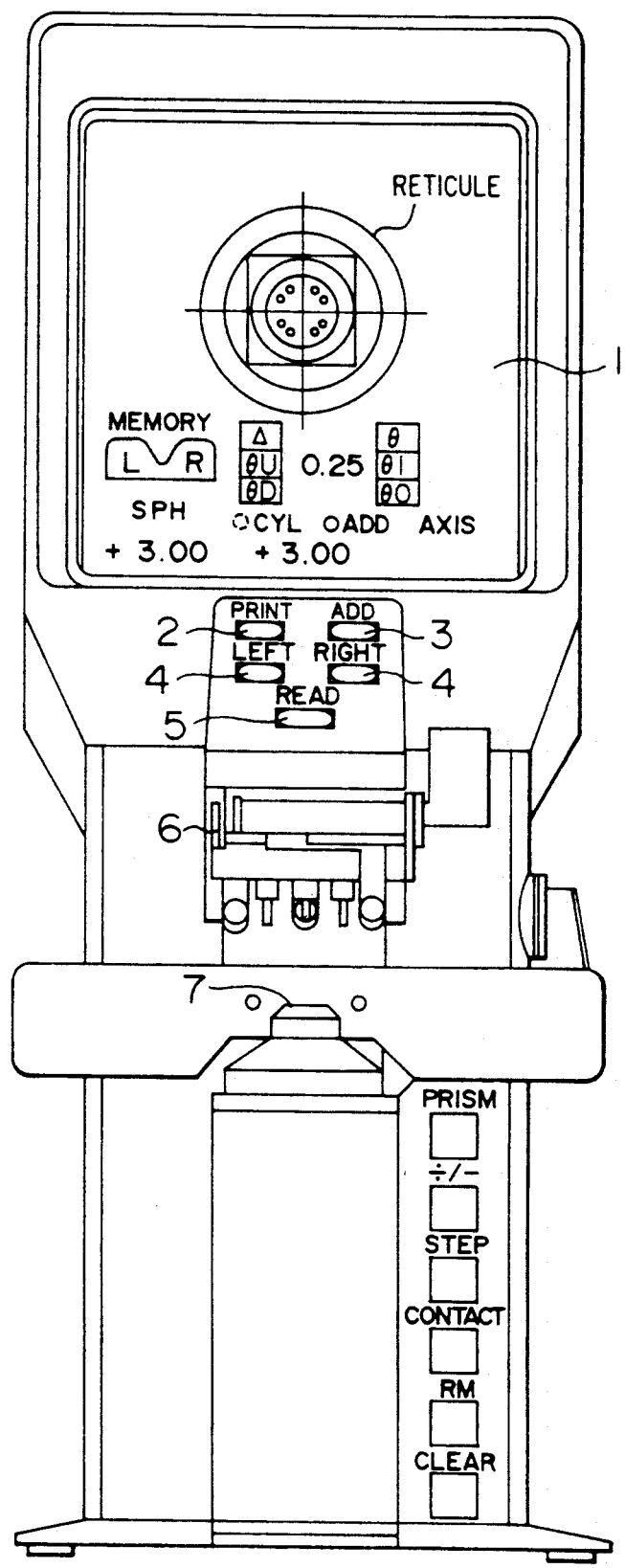
FIG. 1 is a front view of an lensmeter in accordance with an embodiment of the present invention.

Referring first to FIG. 1, there is shown an exterior appearance view of an automatic lensmeter in accordance with an embodiment of the present invention.

The automatic lensmeter of FIG. 1 includes a display 1 on which a reticule for indicating the optical axis of a measuring optical system, a corona target for alignment measured results, etc. are displayed. The display 1 comprises a CRT display or an LED dot matrix display. The illustrated lensmeter also includes a PRINT switch 2 for printing the measured results an ADD switch 3 for switching to an addition diopter measurement mode, LEFT/RIGHT switches 4 for selecting to measure a left-eye or a right-eye lens, a READ switch 5 for reading measured values, a lens holder 6, and a nose piece 7. The nose piece 7 carries a lens to be examined so as to hold the lens cooperatively with the lens holder 6 lowered to the lens and held therebetween.

Explanation will next be made as to an embodiment of a measuring optical system for the automatic lensmeter.

Figure 2:
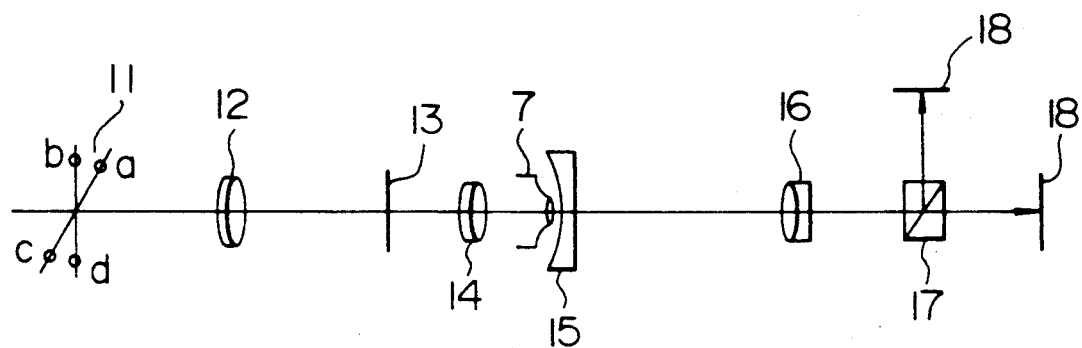
FIG. 2 is an arrangement of an optical system used in the automatic lensmeter.
Figure 4:
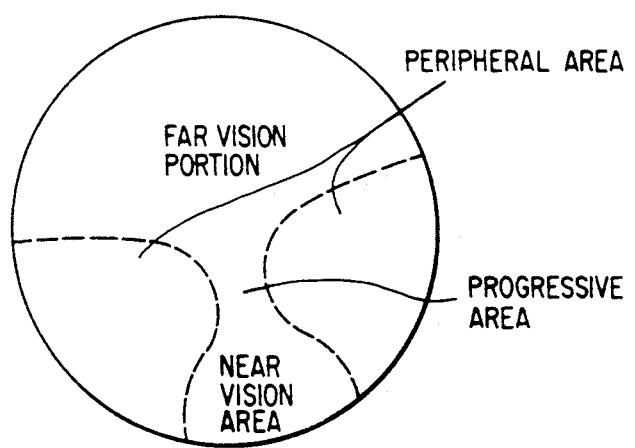
FIG. 4 is a diagram for roughly explaining the portions of a progressive addition lens.

FIG. 2 shows an arrangement of the optical system of the automatic lensmeter.

In the system, four light emitting diodes (LEDs) a, b, c and d 11 are arranged in the vicinity of the focus of an objective lens 12 so as to be perpendicular to the optical axis of the system. When a lens 15 to be measured is mounted on the nose piece 7, a command issued from a computer causes a LED driver to be operated so that the four LEDs a, b, c and d are sequentially turned ON. A target 13 having slits perpendicular to each other is positioned fixedly or movably between the objective lens 12 and a collimater lens 14 in the vicinity of the focal point thereof.

The nose piece 7 is disposed between the collimater lens 14 and a focusing lens 16 in the vicinity of the focal point thereof. Image sensors 18 are provided to be perpendicular to the optical axis with respect to a half prism 17.

In operation, light emitted from the LEDs is passed through the objective lens 12, the collimater lens 14, lens 15 to be examined and focusing lens 16 and then focused on the two image sensors 18 disposed perpendicular to each other.

As shown in FIG. 3, a signal indicative of outputs of the two image sensors 18 is applied through a CCD driving circuit 21 to a comparator 22 and a peak hold circuit 23. A peak voltage detected at the peak hold circuit 23 is converted at an A/D converter 24 into a digital signal that is then applied to a computer 25. The digital signal is further sent from the computer 25 to a D/A converter 26 and then converted into a voltage signal therein corresponding to ½ of the peak voltage. The converted voltage signal is then applied to the comparator 22. The comparator 22 compares this voltage signal received from the D/A converter 26 with the signal received directly from the CCD driving circuit 21 and generates a strobe signal. A latch 28, when receiving the strobe signal from the comparator 22, receives a signal from a counter 27, reads out a position of the border of a bright portion and a dark portion from the waveform of the signal, and detects its coordinate position through the computer 25.

Explanation will next be briefly made as to how to calculate a measurement value from the detected coordinate position.

The target 13 is subjected to individual illumination from the four LEDs. In the case where a lens to be examined is not mounted on the nose piece 7 or a lens having a zero diopter to be examined is mounted on the nose piece 7, target images formed on the image sensors 18 are all overlapped each other.

In the case where the lens 15 to be examined has only spherical refractive power, the target images formed on the image sensors 18 are shifted in position on the image sensors 18 by a movement corresponding to the spherical diopter.

In the case where the lens 15 to be examined has only cylindrical refractive power, a light beam incident upon the cylindrical lens is subjected to refractive power in the direction perpendicular to its principal meridian (or in the same direction as the principal meridian). On the basis of the movement of the target images, the cylindrical diopter can be calculated.

In the case where the lens 15 to be examined has both spherical and cylindrical powers, the target images are focused on and shifted onto the image sensors 18 by amounts corresponding to the respective diopters.

When the LEDs a, b, c and d are turned ON, spherical diopter S, cylindrical diopter C, axial angle $\theta$ and prism power are expressed as follows.

$$S = (X_2 + Y_2 \pm C)/2$$

$$C = \sqrt{(X_2 - Y_2)^2 - 2(X_1^2 + Y_1^2)}$$

$$\theta = \tan^{-1}\sqrt{(X_2 - S)/(Y_2 - S)} \text{ or }$$
$$\tan^{-2}\sqrt{(Y_2 - S)/(X_2 - S)}$$

Prism power =

$$\sqrt{\left(\frac{X_a + X_b + X_c + X_d}{4}\right)^2 + \left(\frac{y_a + y_b + y_c - y_d}{4}\right)^2}$$

where A $(x_a, y_a)$, B $(x_b, y_b)$, C $(x_c, y_c)$ and D $(x_d, Y_d)$ denote the centers of the target images and the following relationships are satisfied.

$$X_1 = |x_b - x_d|, X_2 = |X_a - x_c|$$

$$Y_1 = |y_a - y_c| \text{ and } Y_2 = |y_b - y_d|$$

Through the computer 25, the coordinate position is detected, the spherical diopter, cylindrical diopter, axial angle and prism power are calculated on the aforementioned equations and then digitally indicated.

In this manner, the optical characteristics of the lens to be examined can be measured. However, in the case where a lens to be examined has diopter (refractive power) other than zero diopter, the four target images are shifted by amounts corresponding to the diopter because of their out-of-focus, which leads to the cause of erroneous measurement. For this reason, it is desirable to move the target to make small these shifts for their out-of-focus and to compute the optical characteristics of the lens to be examined on the basis of the shifts and the target movements.

Figure 5:
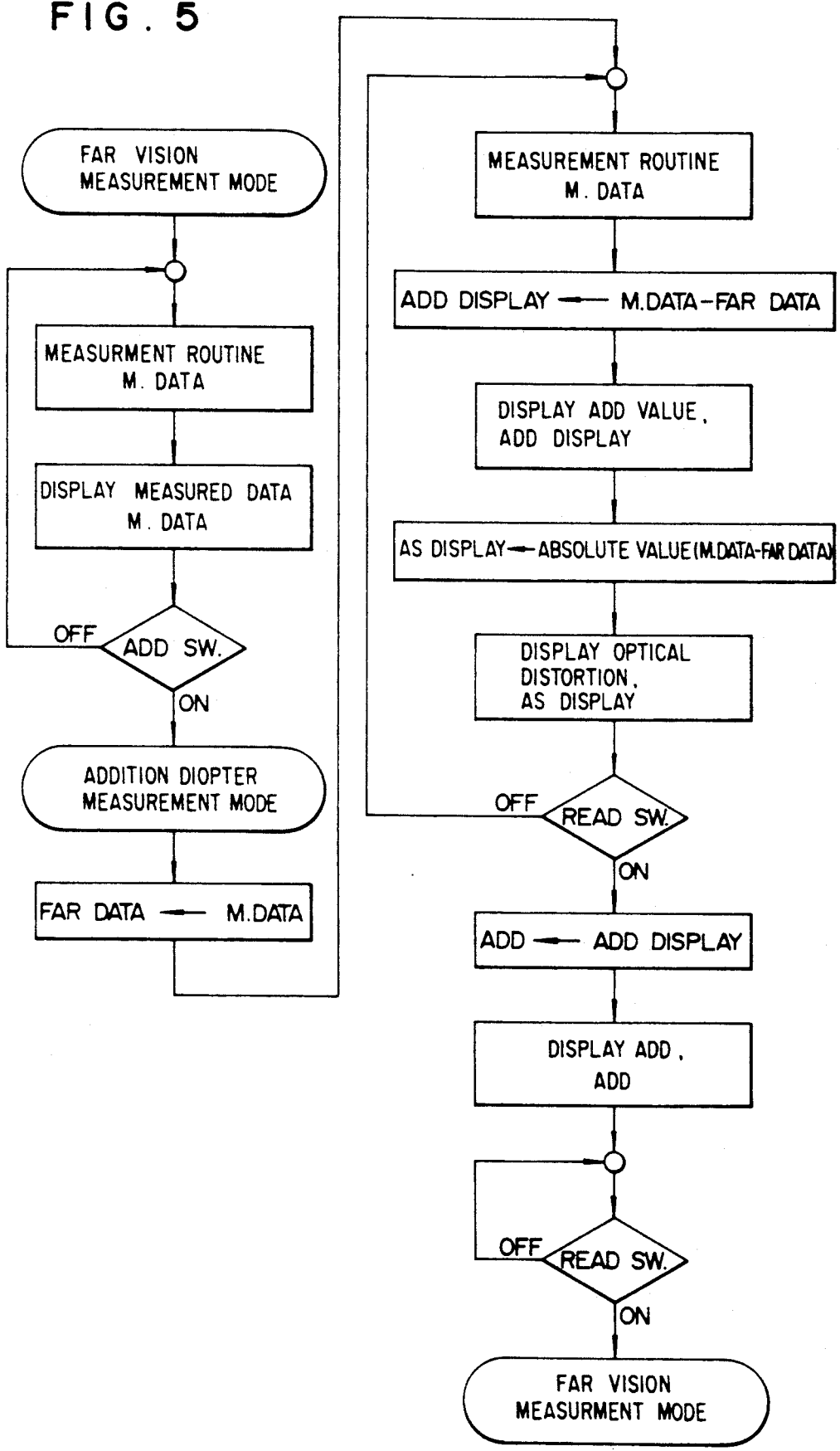
FIG. 5 is a flowchart for explaining how to measure with the use of the automatic lensmeter of the embodiment.

Explanation will be made as to how to measure a progressive addition lens with use of the automatic lensmeter having such a measuring system, by referring to a flowchart of FIG. 5.

First of all, an operator mounts one ophthalmic lens into a pair of spectacles on the nose piece 7 so that the lens abuts at its concave side against the nose piece, holds stably the lens by means of the lens holder 6, and then pushes either one of the LEFT/RIGHT switches 4.

The operator moves the progressive addition lens to be examined in such a manner that a light beam can be made incident upon a far vision portion of the lens. More specifically, the operator sets the lens on the lensmeter so that the light is directed to the zone of the far vision portion of the lens which corresponds to the upper part of the lens and which is not covered with its spectacles frame. The operator moves the spectacles so that a target is located in the center. Note that a far vision portion is a relatively broad when compared with a near vision portion, but some spectacles may involve an optical distortion in both sides of its far vision portion, depending on the lens type.

Since measurement is carried out continually at constant time intervals, its measured values are indicated in the lower part of the display 1. It is confirmed that a movement of the lens to a slightly lower position causes no change of the measured value. If an operator confirms no change in the measured value, then he pushes the ADD switch 3 to change over to the addition diopter measurement mode, whereby the measured value for the far vision portion is stored in the memory.

When the operator pushes the ADD switch 3, an ADD indicator provided in the lower central part of the display 1 in FIG. 1 is turned ON to indicate the addition diopter measurement mode. Also, the addition diopter is indicated in a column "ADD" below the ADD indicator.

After confirming the addition diopter measurement mode, the operator moves the lens to be examined to the near-vision area.

Measurement is carried out continually at constant time intervals and its computation is effected in accordance with the following equation. The computed result is continually indicated in the column "ADD".

Addition diopter = (Near-vision diopter)
− (Far-vision diopter)

The addition diopter is calculated in terms of a equivalent spherical diopter (SE value).

Further, optical distortion is calculated in accordance with the following equation and its calculated result is indicated as "0.25" above the column "ADD" of the display 1.

Optical distortion = (Near-vision cylindrical diopter)
− (Far-vision-cylindrical diopter)

Accordingly, the operator moves the lens leftward or rightward so that the optical distortion becomes a minimum. When the indicated value of the optical distortion becomes zero, he moves the measuring position of the lens vertically (in the drawing) (that is, toward or away from the operator at the time of actually measuring in front of the automatic lensmeter) to observe a change in the then ADD value. When the ADD values becomes a maximum, the operator stops moving the lens and then pushes the READ switch 5 to measure its addition diopter.

It will be readily appreciated that the present invention may be modified to various arrangements wherein after storage of a measured-value result for the far vision portion. Such various arrangements would encompass different embodiments of the present invention, the measuring switch 3 is pushed, without departing from the major subject of the present invention.

In accordance with the automatic lensmeter of the present invention, as has been disclosed in the foregoing, at the time of measuring the addition diopter of a progressive addition lens, an optical distortion measured in its peripheral portion is indicated so that the peripheral portion causing measurement errors can be prevented from being measured and only a progressive portion or a near vision portion can be measured, whereby measurement of the lens can be accurately carried out.

What is claimed is:

1. An automatic lensmeter wherein a target having a predetermined pattern provided on an object or image side of a lens to be examined is subjected to projection of a measuring light beam to form a projected target image of the lens, the target image is detected at light receiving elements, and optical characteristics of the lens under examination are measured on the basis of detected results, the lensmeter comprising:
   a mode change-over switch for switching to an addition diopter measurement mode;
   memory means for storing a cylindrical diopter of optical characteristics of a measured far-vision area of the lens;
   calculation means for calculating a difference between the cylindrical diopter measured in the addition diopter measurement mode and the cylindrical diopter of the far vision area of the lens; and
   display means for indicating a calculated result of the calculation means thereon.

2. An automatic lensmeter as set forth in claim 1, wherein said measured optical characteristics include a spherical diopter, a cylindrical diopter, an axial angle and a prism power.

3. An automatic lensmeter for a lens to be tested having a predetermined pattern formed on an object or image side of the lens, the lensmeter comprising:
   a measuring light source means for projecting predetermined light signals;
   a target having a predetermined pattern formed thereon, the light signal from said light source means being projected through said target so as to form a predetermined target image on the lens;
   holding means for holding the lens such that the target image is projected on the lens;
   image sensor means for detecting the predetermined target image from the lens and for generating input signals corresponding to optical characteristics of the lens;
   measuring means connected to said image sensor means, for measuring the optical characteristics of the lens based on the input signals from said image sensor means, said measuring means further for measuring a cylindrical diopter of the lens in at least one of an addition diopter measurement mode and far-vision area mode;
   a mode change-over switch means connected to said measuring means, for switching to the addition diopter measurement mode;
   memory means connected to said measuring means for storing a cylindrical diopter of a measured far-vision area of the lens;
   calculation means for calculating a difference between a cylindrical diopter measured in the addition diopter measurement mode and the cylindrical diopter of the measured far-vision area of the lens; and
   display means for displaying a calculated result of said calculation means.

4. An automatic lensmeter for a lens having a predetermined pattern provided on an object or image side of the lens according to claim 3, wherein the optical characteristics measured by said measuring means include a spherical diopter, an axial angle, and a prism power.

5. An automatic lensmeter for a lens having a predetermined pattern provided on an object or image side of the lens according to claim 3, further comprising:
   an objective lens located between said light source means and said target such that said light source means is perpendicular to an optical axis of the lensmeter;
   a collimater lens located between said target and said holding means holding the lens to be tested, said target being movably positionable between said objective lens and said collimater lens;
   a focusing lens located between said image sensor means and said holding means; and
   a half prism means for directing the predetermined target image from the lens to be detected as two predetermined target images to said image sensor means, wherein said image sensor means includes two image sensors located perpendicular to each other.

* * * * *